(No Model.) 3 Sheets—Sheet 1.

T. H. MÜLLER & H. R. WINKELMANN.
COUPLING FOR STEAM PIPES.

No. 559,945. Patented May 12, 1896.

WITNESSES
Hamilton D. Turner
William A. Barr

INVENTORS
Teile H. Müller
Herman R. Winkelmann
By their Attorneys
Howson & Howson

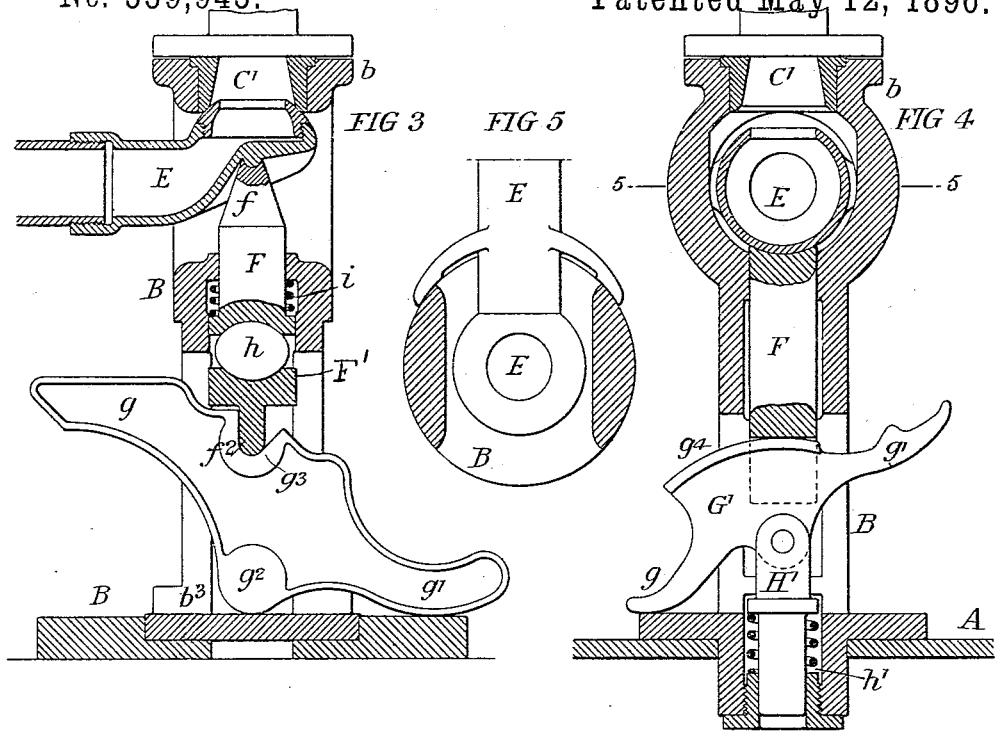

(No Model.) 3 Sheets—Sheet 3.
T. H. MÜLLER & H. R. WINKELMANN.
COUPLING FOR STEAM PIPES.
No. 559,945. Patented May 12, 1896.
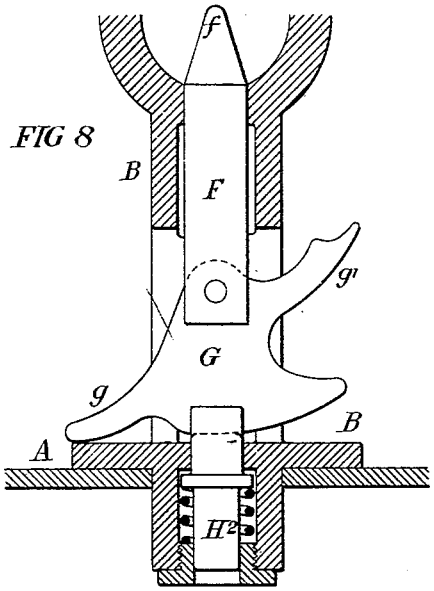
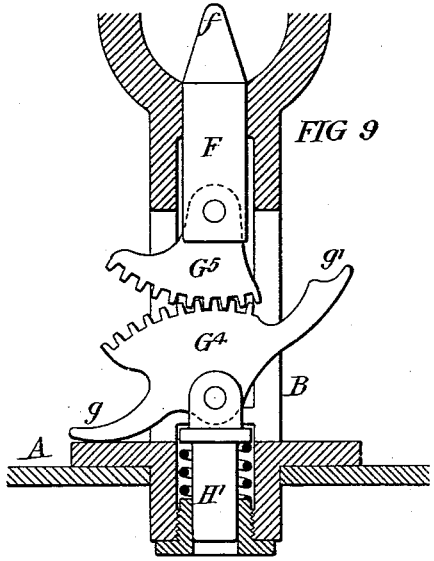
WITNESSES
INVENTORS
Teile H. Müller
Herman R. Winkelmann
By their Attorneys

United States Patent Office.

TEILE H. MÜLLER, OF PHILADELPHIA, PENNSYLVANIA, AND HERMAN R. WINKELMANN, OF BROOKLYN, NEW YORK.

COUPLING FOR STEAM-PIPES.

SPECIFICATION forming part of Letters Patent No. 559,945, dated May 12, 1896.

Application filed March 31, 1894. Serial No. 505,929. (No model.)

*To all whom it may concern:*

Be it known that we, TEILE H. MÜLLER, a resident of Philadelphia, Pennsylvania, and HERMAN R. WINKELMANN, a resident of Brooklyn, New York, citizens of the United States, have invented certain Improvements in Couplings for Steam-Pipes, of which the following is a specification.

The object of our invention is to construct a steam-coupling especially adapted for coupling the steam-pipe on a locomotive-tender to the steam-pipe of an automatic steam-actuated water-elevator, although it will be understood that the coupling may be used in other places without departing from our invention.

Figure 1:
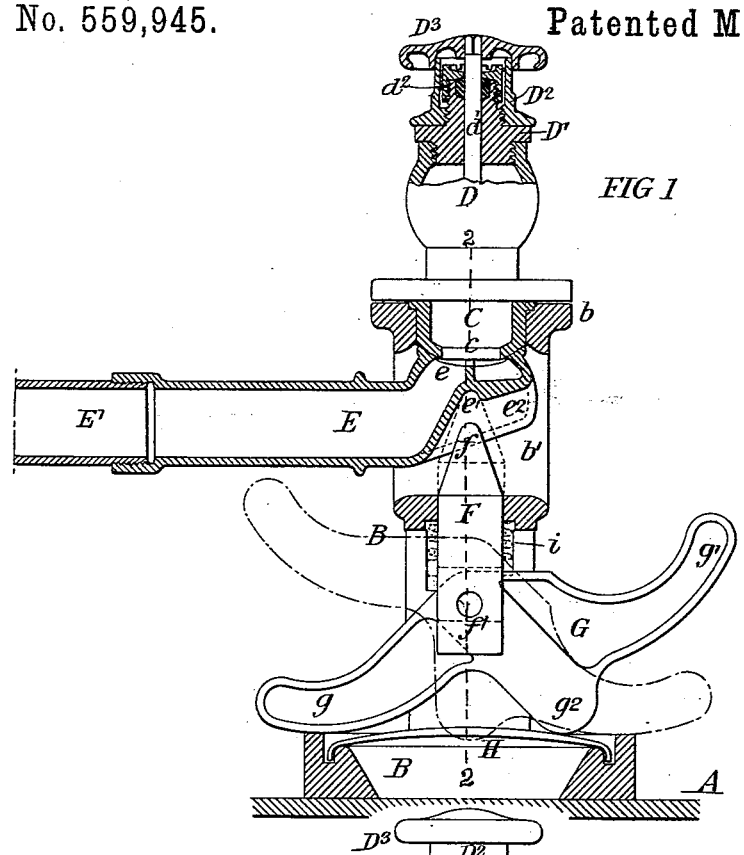
Figure 2:
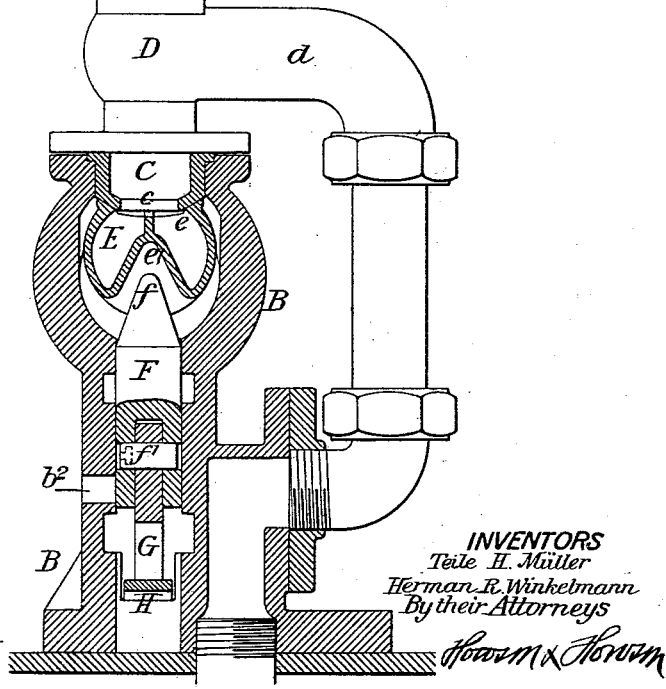

In the accompanying drawings, Figure 1 is a sectional elevation illustrating our invention. Fig. 2 is a section on the line 2 2, Fig. 1. Fig. 3 is a sectional elevation of a coupling, showing the cam and a coiled spring. Fig. 4 is a sectional elevation of a modification. Fig. 5 is a section on the line 5 5, Fig. 4. Fig. 6 is a sectional elevation of another form of coupling, in which a spring-plunger, lever, and connecting-links are used. Fig. 7 is a view showing a double cam. Fig. 8 is a view showing the cam pivoted to the plunger. Fig. 9 is a view showing two cam-arcs geared together.

It is desirable to provide a coupling for attaching the steam-pipe of a water-elevator to the steam-pipe on a locomotive-tender with mechanism that can be readily operated by the fireman and which will be steam-tight and which can be readily uncoupled as soon as the tank is filled. The mechanism which we will now describe is operated by the foot. The fireman places the section of coupling which is attached to the pipe from the water-elevator in position and presses his foot upon the lever, causing the plunger to force the movable portion of the coupling tightly against the stationary portion, so that when steam passes through the pipe the coupling will be steam-tight, yet can readily be detached by placing the foot on the opposite end of the lever.

Referring in the first instance to Figs. 1 and 2, A is the top of the tender-tank, to which is secured the frame B of the coupling. In the head $b$ of this frame is inserted a seat C, having a curved lower surface and an opening $c$ for the passage of steam. This curved surface forms the ball of the coupling, as it will be understood that the coupling must be so arranged that the pipes can be coupled within a certain radius.

Mounted on the head $b$ is a valve D for regulating the flow of steam through the coupling from the steam-pipe $d$, which in the present instance extends to the steam-dome of the locomotive. Below the head $b$ of the frame B is the space $b'$, open at both sides, as shown in Fig. 1, so that the pipe E, forming a continuation of the water-elevator pipe E', can pass into the frame from either side. This pipe in the present instance has a socket $e$, into which extends the ball of the seat C. The ball and its socket are ground so as to form a steam-tight joint. A pocket $e'$ is formed in the under side of the pipe E in line with the center of the socket, and to this pocket is adapted the conical end $f$ of a plunger F. The flanges $e^2$ on the pipe E extend on each side of the pocket, forming a guideway, so that the pipe can be readily placed in position over the plunger.

The plunger F is guided in the frame B, and to the plunger is pivoted a lever G by a pin $f'$. This lever has two arms $g$ $g'$ and a heel $g^2$, which in the present instance rests upon a flat spring H, mounted in the base of the frame B. When the arm $g$ is pressed down, the lever is in the position shown in Fig. 1 and the plunger is withdrawn, so that the pipe E can be readily removed or placed in position.

By placing the foot upon the arm $g'$ of the lever the heel $g^2$ will be forced toward the center, as shown by dotted lines, and the plunger will be raised and will force the pipe E hard against the seat C of the coupling, making a steam-tight joint.

By turning the valve D steam will flow through the pipes to the water-elevator, and when sufficient steam is introduced it can be cut off by the valve, and by simply placing the foot on the arm $g$ of the lever G the parts can be uncoupled. The spring H exerts a yielding pressure upon the coupling, so that it will accommodate any irregularities and take up for wear. In some instances a spring $i$ may be introduced between the plunger and the flange of the frame B in order to quickly withdraw the plunger from the pocket $e'$; but we find in this instance that it is not absolutely necessary, but we prefer to use it in the device, as shown in Fig. 3. As it will be noticed in Fig. 2, the pivot-pin $f'$ may be removed through an opening $b^2$ in the frame B, and, as shown by dotted lines, the pin has an undercut hole, into which can be inserted a hooked tool for withdrawing the pin.

The valve which is mounted on top of the structure is made as shown in Fig. 1, and in order to protect the stem $d'$ of the valve we mount on the cap D' a sleeve $D^2$, which extends over the stuffing-box $d^2$, and a hand-wheel $D^3$ is secured to the valve-stem in any suitable manner and extends down over the sleeve $D^2$, so that the stem and stuffing-box are protected by the sleeve and hand-wheel, so that if the valve is struck the stem will not be injured, as the blow will be taken up by the hand-wheel or sleeve.

In Fig. 3 we have shown a device somewhat similar to that shown in Fig. 1, with the exception that the heel $g^2$ of the lever rests upon a steel plate $b^3$ in the base, and between the plunger F and the lever G is inserted a plunger F, having an extension $f^2$, adapted to the pocket $g^3$ in the lever G, and between the two plungers is inserted a spring $h$, which in the present instance is made of rubber and is a substitute for the flat spring H. In this instance the plunger F has a collar, and between the collar and a flange on the casing is inserted a coiled spring $i$ for redrawing the plunger F after the lever has released it. The coupling in this instance is slightly different, the socket being on the fixed seat C' and the ball on the movable pipe E.

In Figs. 4 and 5 we have shown a device in which the plunger is actuated by a cam-lever G', having a cam-face $g^4$, which slides into a T-shaped opening in the plunger F, so that when the lever is moved in one position the cam $g^4$ will raise the plunger and when moved in the opposite direction will withdraw the plunger. A coiled spring $h'$ is placed under the pivot-block H', to which the lever G' is pivoted, so as to give yielding pressure to the plunger.

In Fig. 6 we have shown the two-armed lever $G^2$ pivoted to the plunger F and connected to the block $H^2$ by a link $j$.

In Fig. 7 we have shown a double-cam lever $G^3$, hung to a fixed pivot-pin and resting in a slot in a long plunger $F^2$, so that when the lever is moved in one position it forces the plunger up and when moved in the opposite direction it withdraws the plunger.

In Fig. 8 we have shown a cam-lever pivoted to the plunger and acting on a block $H^2$, being the reverse of the lever shown in Fig. 4.

In Fig. 9 we have shown two geared segmental cams $G^4$ and $G^5$. The segment $G^5$ is pivoted to the plunger F, and the segment $G^4$ has two arms. When one arm is forced down, it will so actuate the segments which are geared together as to raise the plunger, and when the other arm is pressed down the plunger will be withdrawn. Thus it will be seen by the above description that when the two parts of the coupling are placed in position by simply operating the lever the plunger can be forced against one part of the coupling to make the coupling perfectly rigid and steam-tight, so that steam can be admitted to the water-elevator from the steam-pipe on the locomotive-tender.

It will be understood that in some instances the coupling may be used for coupling the air-pipes of a compressed-air water-elevator; but it is especially adapted for coupling steam-pipes and for use especially in connection with water-elevators.

We claim as our invention—

1. The combination of the frame having one part of a coupling, a movable pipe having the other part of the coupling, a plunger adapted to force the two parts together, a pivoted foot-lever having two arms, a heel $g^2$ adapted to slide on the base and a spring between the fixed part and the plunger, substantially as described.

2. The combination of the frame having one part of the coupling, a movable pipe having the other part of the coupling, a sliding plunger mounted in the frame and adapted to force the movable part of the coupling against the fixed part, a spring for withdrawing the plunger, a pivoted lever for actuating the plunger and a compensating spring, substantially as described.

3. The combination of the frame having the fixed portion of the coupling, a movable pipe having the other portion of the coupling, a vertical plunger, a lever pivoted to the plunger and having two arms and a heel, with a flat spring mounted in the base of the frame upon which the heel of the lever travels, substantially as described.

In testimony whereof we have signed our names to this specification in the presence of two subscribing witnesses.

TEILE H. MÜLLER.
HERMAN R. WINKELMANN.

Witnesses to the signature of Teile H. Müller:
 WILLIAM S. BARR,
 JOSEPH H. KLEIN.

Witnesses to the signature of Herman R. Winkelmann:
 EDITH J. GRISWOLD,
 HUBERT HOWSON.